(12) United States Patent
Angelhag et al.

(10) Patent No.: US 7,769,348 B2
(45) Date of Patent: Aug. 3, 2010

(54) AD-HOC CONNECTIVITY SYSTEM AND METHOD

(75) Inventors: Anders Angelhag, Lund (SE); William Camp, Chapel Hill, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 761 days.

(21) Appl. No.: 11/625,143

(22) Filed: Jan. 19, 2007

(65) Prior Publication Data

US 2008/0125041 A1    May 29, 2008

Related U.S. Application Data

(60) Provisional application No. 60/867,153, filed on Nov. 24, 2006.

(51) Int. Cl.
*H04B 7/00*    (2006.01)
(52) U.S. Cl. ..................... 455/41.2; 455/411
(58) Field of Classification Search ............... 455/41.2, 455/411
See application file for complete search history.

(56) References Cited

U.S. PATENT DOCUMENTS

| | | | | |
|---|---|---|---|---|
| 6,594,503 | B1 * | 7/2003 | Herzig et al. | 455/550.1 |
| 6,940,543 | B2 * | 9/2005 | Perotti et al. | 348/211.2 |
| 7,039,391 | B2 * | 5/2006 | Rezvani et al. | 455/411 |
| 2005/0233771 | A1 * | 10/2005 | Aflalo et al. | 455/562.1 |
| 2006/0046719 | A1 | 3/2006 | Holtschneider | |
| 2006/0172711 | A1 | 8/2006 | King et al. | |
| 2006/0174203 | A1 * | 8/2006 | Jung et al. | 715/751 |
| 2007/0021065 | A1 * | 1/2007 | Sengupta et al. | 455/41.2 |
| 2007/0054617 | A1 * | 3/2007 | Nikolajevic et al. | 455/41.2 |
| 2008/0125041 | A1 * | 5/2008 | Angelhag et al. | 455/41.2 |

FOREIGN PATENT DOCUMENTS

WO    WO2004/008788 A1    1/2004

OTHER PUBLICATIONS

International Search Report with Written Opinion mailed Sep. 3, 2007, 11 pages.

* cited by examiner

*Primary Examiner*—Edward Urban
*Assistant Examiner*—Golam Sorowar
(74) *Attorney, Agent, or Firm*—Harrity & Harrity, LLP

(57) ABSTRACT

The invention includes a method for a wireless connection of a wireless portable device 10 to a selected wireless device 10*a* in a group of nearby wireless devices 10*a*-10*c*, which device 10 is provided with a short-range-unit 50 for a wireless communication with said group of nearby devices 10*a*-10*c*, a substantially omnidirectional antenna 52 connected to said short-range-unit 50 for a substantially omnidirectional communication, and at least one directional communication device 54, 24 for a directional communication, which method includes the steps of: activating the directional communication device 54, 24; directing the directional communication device 54, 24 towards a nearby device 10*a*; connecting the portable device 10 to the selected device 10*a* using the directional communication device 54, 24; communicating with the selected device 10*a* via said substantially omnidirectional antenna 52 after said connecting.

16 Claims, 5 Drawing Sheets

AD-HOC CONNECTIVITY SYSTEM AND METHOD

RELATED APPLICATION

This application claims priority under 35 U.S.C. §119 based on U.S. Provisional Application Ser. No. 60/867,153, filed Nov. 24, 2006, the disclosure of which is incorporated herein by reference.

BACKGROUND

1. Technical Field of the Invention

The present invention relates to electronic devices and, more particularly, to portable communication devices provided with short range communication capabilities for ad hoc communication.

2. Description of Related Art

A current trend within the field of portable devices is to provide the devices with ever increasing functionality. In particular, a trend of providing portable devices with an increased ability to handle multimedia items, such as various sounds (e.g., music), images (e.g., photos), videos (e.g., movies), etc. The multimedia may be recorded and/or downloaded by the portable device. Similarly, various game and amusement items have been introduced into portable devices with ever increasing regularity.

As portable devices have become more competent and more like stationary devices, the need for exchanging multimedia items between different devices has become increasingly interesting and significant. For example, a user may like to watch a movie on the home television or listen to a music piece on the home sound system, as well as enjoy such items on a portable device. In another situation, a user may like to present images or videos recorded by a portable device. It would then be advantageous if these images or video sequences could be easily transferred to a television set or a device connected to a television set for providing a larger monitor that can be easily enjoyed by more than one viewer. A need may also exist for storing images or videos recorded by a portable device in a stationary memory having a larger storage capacity. Again, it would be advantageous if the images and/or video sequences could be easily transferred to the stationary memory. On the whole, many situations occur in which it would be advantageous to transfer multimedia items and amusement items between different devices.

An existing technology for an easy transfer of multimedia and amusement items between different devices is the so-called, Wireless Local Area Networks (WLANs) and, in particular, the so-called, WiFi technology. The WiFi (also denoted, Wi-Fi, wifi, etc.) is a brand that was originally licensed by the WiFi Alliance to describe the underlying technology of WLANs based on the IEEE 802.11 specifications or similar standard. A person with a WiFi-enabled device, such as a cell phone, a PDA or the like can, for example, connect to the Internet when in proximity of an access point. The space covered by one or several access points is deemed a "hotspot." WiFi also allows connectivity in peer-to-peer mode, which enables devices to connect directly to each other. Peer-to-peer connectivity mode is particularly useful, for example, in consumer electronics and gaming applications and or the like.

However, in many homes and offices, high-density areas will have several WiFi-equipped devices. Since WiFi devices have rather long-range capabilities, they will effectively cover much of the same area. Concerns arise for secure ease of use when connecting a WiFi-equipped portable device to another WiFi device in an environment in which the portable device finds a plurality of devices (e.g., 5) located in line-of-sight, for example, and even more (e.g., 15) devices within WiFi range located relatively nearby.

Proposed attempts to resolve connectivity issues involve scanning for WiFi devices and the user selecting from a long list of compatible devices within range, including known devices located at neighbors etc. Over time, the user may compile a list of favorites, which may simplify the selection process. However, the user might end up with a rather long list of favorite devices at home, at the office, in the car, at a vacation spot, etc., thereby diminishing the advantages of the compiled list of favorites.

In view of the above, it may be advantageous to provide an improved wireless connection of a portable device to a selected device in a group of nearby devices. In a particular aspect, it would be advantageous to provide the improved wireless connection with a minimum of additional circuitry in and signal processing by the portable device.

SUMMARY

The present invention is directed to providing a wireless connection of a portable device to a selected device from among a group of nearby devices. According to one implementation of the present invention, it would be advantageous to provide wireless connection selectivity with a minimum of additional circuitry and signal processing in the portable device.

Implementations of the present invention provide wireless connectivity for a portable device to a target device selected from a group of nearby available devices.

According to a first aspect of the present invention which provides a method for a wireless connection of a wireless portable device to a selected wireless device in a group of nearby wireless devices, which portable device is provided with a short-range-unit for a wireless communication with said group of nearby wireless devices, a substantially omni-directional antenna connected to said short-range-unit for a substantially omnidirectional communication, and at least one directional communication device connected to said short-range-unit for a substantially directional communication, the method includes activating the directional communication device; directing the directional communication device towards a nearby wireless device; connecting the portable device to the selected device using the directional communication device; and communicating with the selected device via said substantially omnidirectional antenna after said connecting.

A second aspect of the invention is directed to a method including the features of the first aspect, characterized by using a directional antenna connected to the short-range-unit as a directional communication-device for a directional communication using electromagnetic radiation.

A third aspect of the invention is directed to a method including the features of the first or the second aspect, characterized by least using a camera included by the portable communication device as a directional communication-device for directional communication by recording information received using light.

A fourth aspect of the invention is directed to a method including the features of the third aspect, characterized by using the camera for directional communication by recording light emitted from the selected device, which light is utilized by the portable device to identify the selected device.

A fifth aspect of the invention is directed to a method including the features of the third aspect, characterized by using the camera for directional communication by recording an image of the selected device, which image is utilized by the portable device to identify the selected device.

A fifth aspect of the invention is directed to a method including the features of the fifth aspect, characterized by extracting any useful connection-information from possible markings in the recorded image.

A seventh aspect of the invention is directed to a method including the features of the first aspect, characterized in that the directional communication-device is activated upon the occurrence of at least one of: the user pushing a button on a key pad of the portable device; the detection of several near by devices; the activation of a software application.

An eighth aspect of the invention is directed to a method including the features of the second aspect, characterized by activating the omnidirectional antenna and execute a measuring of the signal strengths from the nearby devices; activating the directional antenna and execute a measuring of the signal strength from at least one nearby device when the directional antenna is directed towards a nearby device; and connecting the portable device to the nearby device having substantially the same signal strength in the omnidirectional measuring and in the directional measuring, or having a higher signal strength in the directional measuring.

A ninth eight aspect of the invention is directed to a method including the features of the second aspect, characterized by activating the omnidirectional antenna and execute a measuring of the signal strengths from the nearby devices; activating the directional antenna and execute a measuring of the signal strength from at least one nearby device when the directional antenna is directed towards a nearby device; and connecting the portable device to the nearby device having the lowest ratio of decrease in signal strength from the omnidirectional measuring to the directional measuring.

A tenth aspect of the invention is directed to a method including the features of the second, eight or ninth aspect, characterized in that the transmission power is reduced when the directional antenna is activated.

According to an eleventh aspect of the present invention directed to a wireless portable device configured to be operatively connected to a selected wireless device in a group of nearby wireless devices, which portable device includes a short-range-unit for a wireless communication with said group of nearby wireless devices, and a substantially omnidirectional antenna connected to said short-range-unit for a substantially omnidirectional communication with said nearby wireless devices, the portable device further comprising: at least one directional communication device connected to said short-range-unit and configured to be operatively directed towards a nearby wireless device and to operatively communicate connection-information with the selected device when the directional communication-device is directed towards said nearby device.

A twelfth aspect of the invention is directed to a portable device including the features of the eleventh aspect, characterized in that the directional communication-device is a directional antenna connected to said short-range-unit for a directional communication using electromagnetic radiation.

A thirteenth aspect of the invention is directed to a portable device including the features of the eleventh or twelfth aspect, characterized in that the directional communication-device is a camera included by the portable communication device for directional communication by recording information received using light.

A fourteenth aspect of the invention is directed to a portable device including the features of the thirteenth aspect, characterized in that the camera is configured for directional communication by recording light emitted from the selected wireless device, and in that the portable device is configured for utilizing the received light to identify the selected device.

A fifteenth aspect of the invention is directed to a portable device including the features of the thirteenth aspect, characterized in that the camera is configured for directional communication by recording an image of the selected wireless device, and in that the portable device is configured to utilize the image to identify the selected device.

A sixteenth aspect of the invention is directed to a portable device including the features of the fifteenth aspect characterized in that the short-range unit is configured for operatively extract any useful connection-information from possible markings in the recorded image.

A seventeenth aspect of the invention is directed to a portable device including the features of the twelfth aspect, characterized in that the directional communication-device is activated upon the occurrence of at least one of: the user pushing a button on a key pad of the portable device; the detection of several near by devices; the activation of a software application.

An eighteenth aspect of the invention is directed to a portable device including the features of the thirteenth aspect, characterized in that the short-range control is configured to operatively activate the omnidirectional antenna and execute a measuring of the signal strengths from the nearby devices; activate the directional antenna and execute a measuring of the signal strength from at least one nearby device when the directional antenna is directed towards a nearby device; connect the portable device to the nearby device having substantially the same signal strength in the omnidirectional measuring and in the directional measuring, or having a higher signal strength in the directional measuring.

A nineteenth aspect of the invention is directed to a portable device including the features of the thirteenth aspect, characterized in that the short-range control is configured to operatively activate the omnidirectional antenna and execute a measuring of the signal strengths from the nearby devices; activate the directional antenna and execute a measuring of the signal strength from at least one nearby device when the directional antenna is directed towards a nearby device; and connect the portable device to the nearby device having the lowest ratio of decrease in signal strength from the omnidirectional measuring to the directional measuring.

An twentieth aspect of the invention is directed to a portable device including the features of the thirteenth aspect, characterized in that the short-range control is configured to operatively reduce the transmission power when the directional antenna is activated.

A twenty-first aspect of the invention is directed to a computer program product stored on a computer usable medium, comprising readable program means for causing a portable device to execute, when said program means is loaded in a portable device comprising a short-range-unit for a wireless communication with said group of nearby devices; a substantially omnidirectional antenna connected to said short-range-unit for a substantially omnidirectional communication; and at least one directional communication device for a directional communication, the steps of: activating the directional communication device; connecting the portable device to a selected device using the directional communication device when the directional communication-device is directed towards the selected device; and communicating with the selected device via said substantially omnidirectional antenna after said connecting.

A twenty-second aspect of the invention is directed to a computer program element having a program recorded thereon, where the program is to make a portable device to execute, when said program means is loaded in the portable device comprising: a short-range-unit for a wireless communication with said group of nearby devices, a substantially omnidirectional antenna connected to said short-range-unit for a substantially omnidirectional communication, and at least one directional communication device for a directional communication, the steps of: activating the directional communication device; connecting the portable device to a selected device using the directional communication device when the directional communication-device is directed towards the selected device; and communicating with the selected device via said substantially omnidirectional antenna after said connecting.

Further advantages of the present invention and embodiments thereof will appear from the following detailed description of the invention.

It should be emphasized that the term "includes/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION

The present invention relates to portable communication devices. Embodiments of the invention relate to wireless communication devices and particular embodiments relate to communication devices comprising an imaging system. On the whole, the invention can be applied to any suitable portable communication device.

Figure 1:
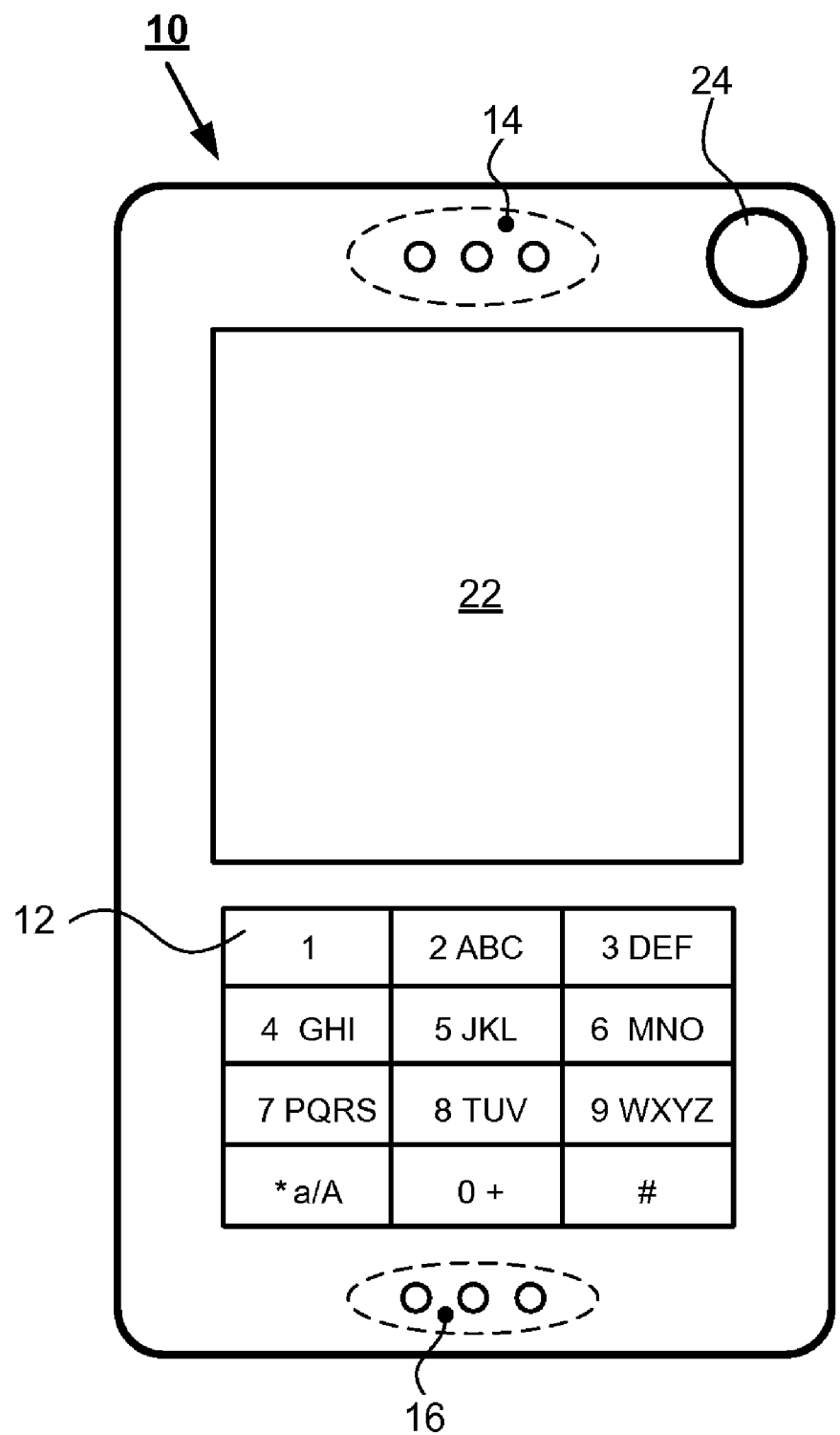
FIG. 1 shows an exemplary device in which systems and methods described herein may be implemented.

A portable communication device according to one embodiment of the present invention is shown in FIG. 1. The implementing device may include phone 10, such as a cell phone or other mobile terminal, configured to operate according to 3G-technology (e.g., W-CDMA or CDMA2000), 2.5-technology (e.g., GPRS) or other communication technology. Information about 3G-technology and 2.5-technology, etc., can be found, for example, in specifications from the 3$^{rd}$ Generation Partnership Project (3GPP), see, e.g., www.3gpp.org.

Phone 10 shown in FIG. 1, may include a keypad 12, a loudspeaker 14, and a microphone 16. Keypad 12 may be used for entering information, such as selection of functions and responding to prompts by a user of phone to inputting via keypad 12. Keypad 12 may be of any suitable type of input mechanisms arrangement, including push-buttons, touch-buttons and/or a combination of different suitable button arrangements or input mechanisms. Loudspeaker 14 may used to presenting audible information and microphone 16 may be used to receive audible input. Phone 10 may also include a display 22 for displaying functions and prompts and other visual and/or graphic information. Display 22 may include a touch-screen for receiving input information.

Phone 10 may also include an antenna to be used for communication with other users via a network. The antenna may be in-built in phone 10 and hence not shown in FIG. 1. Various antenna(e) arrangements, including functionality, are possible and will be discussed in more detail below.

Phone 10 may also include a camera arrangement 24 for enabling images to be digitally recorded by phone 10. In one implementation, camera arrangement 24 may includes a lens and/or a lens system and an image sensor such as a CCD (charged couple device) that includes an integrated circuit with an array of linked/coupled capacitors sensitive to the light. Naturally, other image sensors are conceivable, for example, an APS (active pixel sensor), that includes an integrated circuit with an array of pixels containing a photo detector, as well as three or more transistors. Display 22 may be configured to present images captured and/or recorded by camera arrangement 24.

It will be appreciated that phone 10 is just one example of a portable device in which the embodiments of the invention may be implemented. Embodiments may be implemented, for instance, in a PDA (personal digital assistant), a palm top computer, a lap top computer or a smartphone or any other suitable portable device, such as a digital camera.

Figure 2:
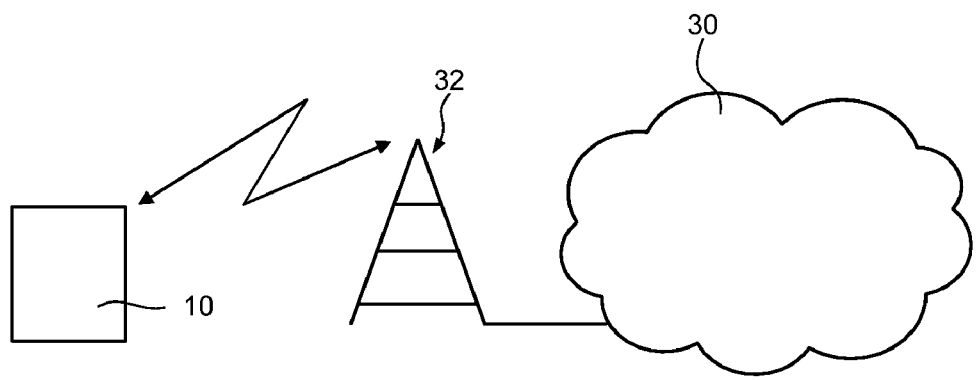
FIG. 2 shows a network in which systems and methods described herein may be implemented.

FIG. 2 shows phone 10 connected to a network 30 (e.g., cellular) via a base station 32. Network 30 may include a GSM or a GPRS network, or any other 2G, 2.5G and/or 2.75G network. Network may include a 3G network, such as a WCDMA network. Network may include some other type of network, such as Internet, a corporate intranet, a LAN, a PSTN, or a wireless LAN.

Figure 3:
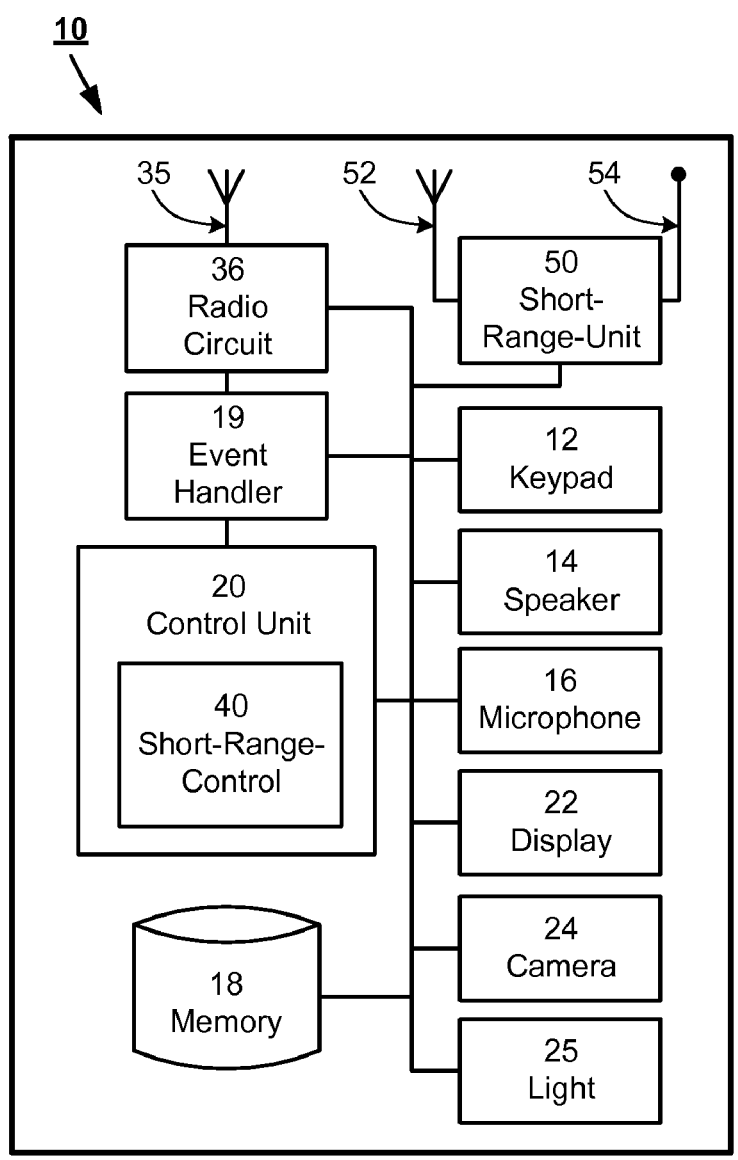
FIG. 3 shows a schematic block diagram of functional components of the device in FIG. 1.

FIG. 3 shows various functional components that may be included in phone 10. Other components are possible. In one implementation, phone 10 may includes keypad 12, speaker 14, microphone 16, display 22, and camera arrangement 24. Phone 10 may include a memory 18 for storing data files, for example, image files produced by camera arrangement 24. Memory 18 may be any suitable memory type that is typically used in portable devices.

Phone 10 may includes an antenna 34 connected to a radio circuit 36 to enable radio communication with network 30. Radio circuit 36 may connect to an event handling unit 19 for handling such events as outgoing and incoming communication to/from external units via network 30, for example, calls and messages, e.g., SMS (short message service) and MMS (multimedia messaging service).

Short-range-unit 50, shown in FIG. 3, may include a WiFi transceiver. As explained above, WiFi denotes a brand that was originally licensed by the WiFi Alliance to describe the underlying technology of WLANs based on the IEEE 802.11 specifications or a similar standard. A WiFi-enabled device, such as a cell phone, a PDA, or the like, may connect to a network, for example, the Internet, when in proximity of an available access point. The space covered by one or several access points is called a "hotspot." WiFi also allows connectivity in peer-to-peer mode, which enables devices to connect directly with each other. Peer-to-peer connectivity is useful, for example, in consumer electronics and gaming applications.

As schematically illustrated in FIG. 3, short-range-unit 50 may connect to a first substantially omnidirectional antenna 52 for use in substantially omnidirectional communication with other WiFi devices or the like in proximity to phone 10. In addition, as is likewise schematically illustrated in FIG. 3, short-range-unit 50 may connect to a second substantially directional (or multi-directional) antenna 54 for use in substantially directional communication with other WiFi devices or the like in proximity to phone 10.

For example, short-range-unit 50 may be configured to operatively switch between the substantially omnidirectional antenna 52 and the substantially directional antenna 54 in sending and/or receiving transmissions. In this regard, short-range-unit 50 may include a switch (not shown) or other device for selecting between antennae 52 and 54 when communicating, for example, with other WiFi devices. The switch may be implemented, for example, using a diode and/or transistor arrangement or the like, as may be known by those skilled in the art.

Directional and omnidirectional properties of the antenna arrangement, including directional antenna 54 and omnidirectional antenna 52, can be accomplished using a range of suitable directional antenna arrangements. For example, the antenna arrangement may alternatively include a group-antenna or the like, for example, an electrically controlled phased array antenna, being configured to produce a variable antenna lobe, i.e. a wide or possibly omnidirectional lobe and a narrow directional lobe. In this regard, short-range-unit 50 can be provided with a lobe-control-arrangement for controlling the lobe-shape of the group antenna or the like. Lobe-control-arrangements may adjust the relative phase shift $\phi$ between successive antenna elements in the group antenna, as may be known by those skilled in the art.

As can be seen in FIG. 3, phone 10 may include a control unit 20 for controlling and/or supervising the operation of phone 10. Control unit 20 may be implemented using hardware and/or software, and it may include one or several hardware units and/or software modules, for example, one or several processor units provided with or having access to the appropriate software and hardware necessary for the functions of phone 10, as may be known by those skilled in the art.

In one implementation, control unit 20 may connect to keypad 12, speaker 14, microphone 16, memory 18, event handling unit 19, display 22, camera arrangement 24, radio unit 36, and/or short-range-unit 50. Control unit 20 may control and/or communicate with one or more of these or other units so as to exchange, for example, information and instructions with the units.

Short-range-control 40 associated with control unit 20, may be implemented using hardware and/or software and may include one or several hardware units and/or software modules, for example, one or several processor units provided with or having access to the software and hardware appropriate for the available functions. Short-range-control 40 may be configured to operatively process the signals that are transmitted and/or received by short-range-unit 50, for example, configured to process signals in connection with a WLAN communication performed using short-range-unit 50. Transmission using WLAN communication and the control thereof may be known by those skilled in the art and the function is a common feature in a wide range of existing portable devices, see for example, the Sony-Ericsson 3G-smartphone P990i.

Short-range-control 40 may be configured to operatively control the antenna lobe created by the antenna arrangement connected to short-range-unit 50. In implementations in which the antenna arrangement includes a first omnidirectional antenna 52 and a second directional antenna 54, the antenna lobe may be controlled, for example, by switching between the two antennas. In this regard, a switch may be configured in short-range-unit 50 to be operatively controlled by short-range-control 40, for example, using instructions sent to short-range-unit 50. In implementations in which the antenna arrangement is a group-antenna (e.g., a phased array antenna) or the like, the antenna arrangement may provide a variable antenna lobe. In one implementation, a lobe-control-arrangement is configured in short-range-unit 50 to be operatively controlled by short-range-control 40, for example, using instructions sent to short-range-unit 50. Such instructions may include, for example, the relative phase shift $\phi$ to be used between successive antenna elements in the group antenna.

It should be appreciated that in addition to the components and units of phone 10 shown in FIG. 3, there may be further parts and units or the like present in phone 10. The components and units shown in FIG. 3 may also connect to more components and units than that illustrated.

Figure 4A:
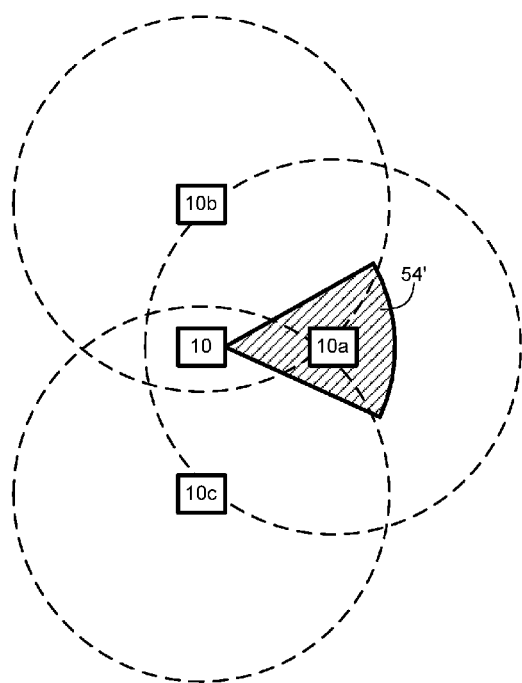
FIGS. 4a and 4b show an exemplary implementation of systems and methods described herein.

Turning now to FIG. 4*a*, which shows a first exemplifying set-up of four WiFi enabled devices, i.e., phone 10 as described above and three peers 10*a*, 10*b*, and 10*c*. WiFi devices 10*a*-10*c* in FIG. 4*a* may include, for example, a WiFi-enabled computer, a CD-player, a DVD-player, a TV, a camera, phone, a PDA, or any other WiFi-enabled media device or the like, e.g., a mass-storage. WiFi devices 10*a*-10*c* may be configured in the same room, building, or general vicinity such that the beacon transmission or the like from at least two or more of WiFi devices 10*a*-10*c* may be detected simultaneously by phone 10 in at least one location. Techniques for detecting one or several WiFi devices and the like may be known by those skilled in the art and used in commercially available products such as cell phones and laptops, see, e.g., the Sony-Ericsson 3G-smartphone P990i.

Transmission ranges of the WiFi devices 10*a*-10*c* have been schematically illustrated in FIG. 4*a* using dashed circles. As can be seen, the transmission ranges are illustrated with rather small circles and it should be appreciated that the ranges may be more extensive. For example, the transmission ranges may be large compared to the distance between the WiFi devices 10*a*-10*c*, such that the common area of the transmission ranges of the devices 10*a*-10*c* can be regarded as substantially identical, i.e., effectively co-extensive. When (WiFi-enabled) phone 10, for example, having omnidirectional antenna 52, enters a space defined by one or more of the transmission ranges, phone 10 may be able to connect to each WiFi device 10*a*-10*c* from which it receives a beacon transmission or the like, i.e., in some instances, all the WiFi devices 10*a*-10*c* may be available to phone 10.

To enable a fast, simple, and intuitive selection of the particular device 10*a*-10*c* to which phone 10 is to connect, omnidirectional antenna 52 may be switched off, while directional antenna 54 may be switched on to form an antenna lobe 54' of predetermined width, i.e., defined scope. Antenna lobe 54' may be, for example, in the interval of from about 20 to about 40 degrees, for example, in the interval of from about 10 to about 30 degrees, from about 15 to about 25. Other intervals are possible. Antenna lobe 54' has been schematically indicated in FIG. 4*a* by a shadowed sector of a circle.

Switching from omnidirectional antenna 52 to directional antenna 54 may be achieved, for example, by a user of phone 10 pushing a button on keypad 22, which may be detected by control unit 20 and short-range-control 40 sending instructions to short-range-unit 50 to switch from omnidirectional antenna 52 to directional antenna 54. Alternatively, omnidirectional antenna 52 may be switched off and directional antenna 54 switched on, upon phone 10 detecting more than one WiFi-enabled device within communicative range of omnidirectional antenna 52.

In some implementations, when the transmission is switched from omnidirectional antenna 52 to directional antenna 54, the transmission power may be reduced by short-range control 40 and/or short-range unit 50. This may advantageously reduce the transmission range and thus the risk that more than one nearby WiFi device may receive the directional transmission so as to be able to communicate with phone 10, i.e., the selection function will be improved in that the likelihood of selecting only one nearby WiFi device is increased.

Upon activation of directional antenna 54 (i.e., deactivation of omnidirectional antenna 52), phone 10 may only be able to detect other WiFi devices that are within the antenna lobe 54' of directional antenna 54. In other words, phone 10 may not detect a WiFi device that is located outside antenna lobe 54' of directional antenna 54, irrespective of the proximity with which a WiFi device may be located to phone 10, where antenna lobe 54' approximates an ideal antenna lobe.

In certain circumstances, it may be difficult to generate antenna lobe 54', in the preferred angular intervals, as discussed above. In addition, directional antenna 54 may have side lobes causing unintended sensitivity outside the main antenna lobe 54'. Consequently, even where directional antenna 54 is activated and the center of directional antenna lobe 54' is directed towards a certain WiFi device (e.g., 10a), phone 10 may nevertheless detect several WiFi devices (e.g., 10b and 10c). In the circumstances, the signal strength from any one WiFi device near or at the center of directional antenna lobe 54' may be substantially unchanged or even stronger compared to the signal strength from the same device received by omnidirectional antenna 52. In contrast, other WiFi devices that are not near or at the center of directional antenna lobe 54' may diminish in signal strength. It should be appreciated that where directional antenna 54 has a low gain, the signal strength received from a certain WiFi device near or at the center of antenna lobe 54' of directional antenna 54 may be lower than the signal strength received from the same device by omnidirectional antenna 52. However, compared to the signal strengths received by omnidirectional antenna 52, the ratio of the decrease in signal strength for the WiFi device near or at the center of antenna lobe 54' will be less than the ratio of the decrease in signal strength for other WiFi devices that are not near the center of directional antenna lobe 54'.

Hence, with reference to FIG. 4a, WiFi device 10a can be more accurately singled out in some embodiments of the invention where omnidirectional antenna 52 is activated for a first measuring of the signal strengths from nearby WiFi devices 10a-10c, whereby directional antenna 54 may be activated for a second measuring of the signal strength from at least one nearby WiFi device when directional antenna 54 is directed towards a certain nearby WiFi device 10a. Phone 10 may then be connected to the nearby WiFi device 10a that has substantially the same signal strength in the first and second measuring, or has higher signal strength in the second measuring. Alternatively, where directional antenna 54 exhibits low gain, phone 10 may connect to nearby WiFi device 10a that displays the lowest ratio of decrease in signal strength from the first to second measuring.

It should be added that the received signal strength for a WiFi device is typically included by the received signal strength indication (RSSI) value for the transmitting device. In one implementation, phone 10 may be configured to measure the above signal strengths by monitoring the RSSI value for nearby WiFi devices 10a-10c.

As described above, activation of directional antenna 54 enables a user of phone 10 to select a WiFi device to which phone 10 is to connect, by simply directing phone 10 and antenna lobe 54' in a direction of the selected WiFi device. One illustration is given in FIG. 4a by schematic antenna lobe 54' emanating from directional antenna 54, from phone 10 being directed to WiFi device 10a. As can be seen in FIG. 4a, WiFi device 10a is now the only WiFi device in range of phone 10, and phone 10 can be unambiguously and safely connected to WiFi device 10a.

The detection of a single WiFi device may be indicated, for example, on display 22 and/or by a particular sound from the loudspeaker 14 of phone 10. A connection to the single WiFi device may be achieved, for example, by the user pushing a button on keypad 22, which may be detected by control unit 20 and short-range-control 40 being configured to operatively connect phone 10 to the single WiFi device using short-range-unit 50. Alternatively a connection to the single WiFi device can be performed by control unit 20, etc. as phone 10 detects a single WiFi device in range of directional antenna 54.

In one implementation, once a connection to the selected WiFi device has been established, directional antenna 54 may be switched off and omnidirectional antenna 52 switched on for ease of maintaining the connection as phone 10 and possibly, the selected WiFi device may move.

Figure 4B:
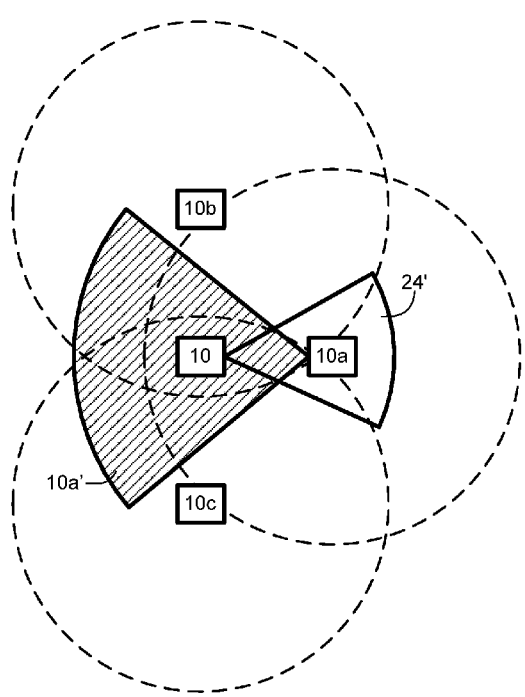

Another embodiment of the present invention is schematically illustrated in FIG. 4b, which shows a second exemplifying set-up of four WiFi enabled devices, i.e., phone 10 as described above, and three peers, WiFi devices 10a, 10b, and 10c. The embodiment is characterized in that a function of directional antenna 54 may be replaced by that of a directional light sensor. In one implementation, camera arrangement 24 may be utilized as the directional light sensor, which is particularly advantageous, since existing hardware (camera arrangement 24) may be used, i.e., the implementation does not require additional hardware.

The angle at which camera arrangement 24 may record light may be preferably adjusted so as to be the same as or similar in shape to the angle of antenna lobe 54' discussed above. This may be achieved, for example, using an autofocus arrangement or the like for adjusting the recording angle as may be known by those skilled in the art. In this manner, a light-sensing-lobe 24' can be created by camera arrangement 24, as is schematically illustrated in FIG. 4b. Activation of camera arrangement 24 as a light sensor may be achieved, for example, by a user of phone 10 pushing a button on keypad 22, which may be detected by control unit 20 which in turn may activate camera arrangement 24. Alternatively, camera arrangement 24 may be activated as a light sensor upon phone 10 detecting more than one WiFi-enabled device in range of omnidirectional antenna 52.

Based on the above, it should be appreciated that the present embodiment presumes that the WiFi device to be selected is provided with a light emitting arrangement suitable to emit light detectable by camera arrangement 24, i.e., the light sensor of camera arrangement 24. In this regard, a light-lobe 10a' emanating from WiFi device 10a has been schematically indicated in FIG. 4b by a shadowed sector of a circle. The scattering angle of light-lobe 10a' may be the same as or similar in shape to the angle of directional antenna lobe 54' discussed above. However, a larger angle is clearly conceivable.

The light may be modulated and/or encoded, and it follows that phone 24 may be able to demodulate/decode the modulated/encoded light in such cases. In one implementation, the light from WiFi device 10a may include useful connection-information so as to facilitate the connection of other WiFi devices, such as phone 10. The connection-information may include, for example, the name of the network (e.g., the Service Set Identifier (SSID)) or the like, to which WiFi device belongs, and possibly the identity or the like of the subject WiFi device. The light emitted by WiFi device 10a may also include such useful connection-information as, which frequency band the device is operating on, which channel in that band, if the connection is open or private, the tariffs to be used, etc. Though it is not a prerequisite for the invention, in one implementation, the light emitted by WiFi device 10*a* may be imperceptible to the human eye (e.g., infrared light or the like) so as to avoid disturbing the user and other persons. It will be appreciated that silicon light sensors, such as CCDs used in digital cameras, may be sensitive to infrared light.

Upon activation of the light sensing feature of camera arrangement 24, a user of phone 10 may select a WiFi device to be connected to phone 10 by simply directing phone 10 and camera arrangement 24 in the direction of the subject WiFi device, for example, WiFi device 10*a*, as illustrated in FIG. 4*b*. When phone 10 receives the light from WiFi device 10*a*, for example, phone 10 may obtain the connection-information included in the light, for example, the name of the network or the like, to which WiFi device 10*a* is associated and possibly the identity or the like of WiFi device 10*a*. The connection-information may then be used by phone 10 for establishing a connection with WiFi device 10*a* pointed out by phone 10 and camera arrangement 24.

In another implementation, a connection to a WiFi device may only be established when phone 10 detects light from a single WiFi device, i.e., no connection is attempted when phone 10 detects illumination from two or more WiFi devices. The light from the different WiFi devices may include, for example, different carrier frequencies so as to enable phone 10 to detect the light from two or more WiFi devices by analyzing the frequency contents of the received light.

Upon connection to the selected WiFi device, in one implementation, the light sensing features of camera arrangement 24 may be switched off, and omnidirectional antenna 52 may be switched on for ease of maintaining the connection as phone 10 and possibly also the selected WiFi device may move.

In one implementation, the alternative light-based embodiment described above may maintain omnidirectional antenna 52 active during the connection procedure, i.e., there is preferably no switching or the like between directional antenna 54 and omnidirectional antenna 54, as in the previously described embodiment. However, the embodiments now described may be combined for an improved reliability (and security) in the connection process.

In another embodiment of the present invention, the content of an image recorded by camera arrangement 24 of phone 10 may be analyzed so as to identify possibly nearby WiFi devices captured in the image. This can be achieved with varying accuracy using substantially any suitable well known image recognition technique, which may compare, for example, the currently recorded image or a representation thereof with pre-stored reference images of various WiFi devices 10*a*-10*c* or representations thereof. For example, the Bayesian Maximum a posteriori difference classifier (Bayesian MAP) or the like, or the Bayesian Maximum Likelihood classifier (Bayesian MP) or the like, may be used.

Reference images or representations thereof may be recorded and/or obtained and stored in phone 10 at an earlier occasion. For example, camera arrangement 24 ma be used to record such reference images of WiFi devices 10*a*-10*c* that are intended to be connected to phone 10. The images and/or representations thereof can then be stored in phone 10 together with information about the WiFi device captured by the subject image, for example, stored together with connection-information such as the name of the network (e.g., the service set identifier (SSID)) or the like, the identity or the like of the subject WiFi device, the frequency band the WiFi device is supposed to operate on, which channel in that band, if the connection is open or private, the tariffs to be used, etc. The connection-information and or the like may be entered, for example, by the user utilizing one or more keys on keypad 12.

Where a WiFi device is actually identified in the currently recorded image, for example, WiFi device 10*a* as shown in FIG. 4*b*, it will be possible to connect phone 10 to WiFi device 10*a* by utilizing information about the identified device 10*a* that have been previously stored in phone 10 together with the image of WiFi device 10*a*.

It may be appreciated that WiFi devices 10*a*-10*c* to which phone 10 is to be connected may be provided with visible information tags or markings that include useful connection-information so as to facilitate the connection of WiFi devices 10*a*-10*c* to phone 10. The markings may include, for example, a two dimensional bar-code or some other indicia including, for example, a representation of the name of the network (e.g., the service set identifier (SSID)) or the like associated with the subject WiFi device and/or the identity or the like of the subject WiFi device, etc. In these cases, the image recorded by camera arrangement 24 may include such markings. Hence, in one implementation, short-range control 40 of phone 10 is configured to operatively extract any useful connection-information from possible markings in the recorded image so as to facilitate the connection of other WiFi devices, such as phone 10. For example, if the indicia includes a two dimensional bar-code, this can be achieved by simply extracting the information included by the bar-code in a well known manner, such as scanning (e.g., checkout counters in retail stores).

Figure 5:
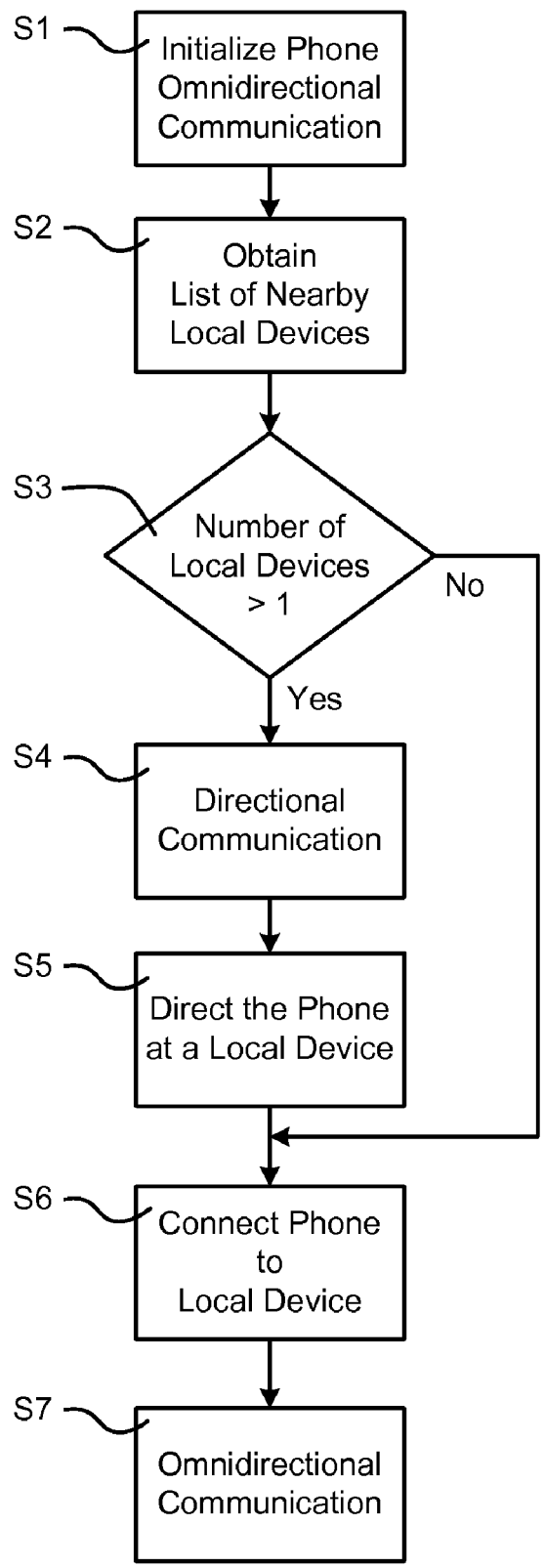
FIG. 5 shows a flow chart for performing the method according to an embodiment of the present invention.

Turning now to the function of an exemplifying embodiment of the present invention, which will be described with reference to FIG. 1-3 together with FIG. 4*a*-4*c*, illustrating two exemplifying set-ups of WiFi devices, FIG. 5 is a flow chart illustrating one embodiment.

As previously explained, an exemplifying portable device in the form of phone 10 according to an embodiment of the invention, may include short-range-unit 50 configured to operatively establish a wireless WiFi communication with a nearby WiFi device. Phone 10 may include a substantially omnidirectional antenna 52 connected to short-range-unit 50 for enabling a substantially omnidirectional communication with the nearby WiFi device. Phone 10 may include at least one directional communication-device, such as omnidirectional antenna 54 or camera arrangement 24 being configured to operatively communicate connection-information with the nearby WiFi device when the directional communication-device is directed towards said nearby WiFi device.

The steps in an exemplifying method for establishing a wireless communication between phone 10 and a nearby WiFi device will now be described with reference to the exemplifying flow chart in FIG. 5. The method may be performed, for example, using short-range-control 40 and/or short-range-unit 50.

In a first step S1 of an exemplifying method according to an embodiment of the present invention the connecting function is initialised by the short-range-control 40 controlling short-range-unit 50. The initialisation includes such actions as activating phone 10 to search for nearby WiFi devices 10*a*-10*c* using the omnidirectional antenna 52. The search is preferably performed, as is well known by those skilled in the art, by listening for beacon transmissions or or the like from possible WiFi devices 10*a*-10*c* in the near vicinity of phone 10.

In a second step S2 of the exemplifying method, a list or the like is prepared that includes the nearby WiFi devices 10*a*-10*c* from which phone 10 has received a beacon transmission or other type of signal indicative of availability. The list may include, for example, the names of the networks or the like to which a certain WiFi device 10a-10c is associated, and possibly the identity or the like of the subject WiFi device. The name of the network and possibly other such identifying information may be included in the beacon transmission received from the WiFi device. The prepared list may be presented via display 22 of the portable communication device (e.g., phone 10), may be known. Alternatively, a presentation of the acquired information may not be rendered.

In a third step S3, it is investigated whether the above-mentioned list includes more than one WiFi device, i.e., whether phone 10 has received a beacon transmission or the like from more than one WiFi device. Where the list identifies a single WiFi device, phone 10 may establish a connection with the identified WiFi device, as indicated in FIG. 5 by the line connecting S3 to S6.

In a fourth step S4, for example, a user of phone 10 may activate a directional communication channel. As described above, this can include activating directional antenna 54 or a directional light sensor feature of camera arrangement 24. However, the invention is not limited to communication using directional electromagnetic radiation, in general, and directional light, in particular. Other media, such as directional ultra-sound or the like may be utilised in some embodiments. An activation of the directional function can be achieved, for example, by the user pushing a button on keypad 22, which may be detected by control unit 20, as described above.

In one implementation, an activation of the directional function can also be performed when a certain software application is activated, for example, when the user selects a photo or some other multimedia item or amusement item to be transferred to another nearby WiFi device. The selection can be achieved, for example, by the user pushing a button on key pad 22. Alternatively, an activation of directional function can be performed as phone 10 detects a plurality of WiFi devices in communicative range of directional antenna 54.

In a fifth step S5, for example, the user of phone 10 may select a WiFi device to be connected to by directing phone 10 at the target WiFi device, as described above with reference to FIGS. 4a-4b.

In a sixth step S6, for example, phone 10 may be connected to the selected WiFi device 10a. In this regard, the selected WiFi device may communicate connection-information so as to facilitate a connection of the selected WiFi device to phone 10. As previously described, the connection-information may include, for example, the name of the network or the like associated with the WiFi device and possibly the identity or the like of the subject WiFi device. The communicated connection-information may enable phone 10 to connect to the selected WiFi device, for example, by connecting to the network and/or device included by the connecting-information, or by connecting to the only WiFi device that is responding to the connecting attempts performed by phone 10. It should be appreciated that the connection-information may simply be the light emitted by a light source configured on the target WiFi device, as in one embodiment described above with reference to FIG. 4b.

In a seventh step S7, for example, phone 10 may continues the communication with the selected WiFi device using omni-directional antenna 52 once a connection has been established with the selected WiFi device using the directional communication channel.

It will be appreciated that the method described above is merely an example of an embodiment of the present invention. Other embodiments of the method may include more steps or fewer steps and the steps may be executed in another order that the one given above.

Figure 6:
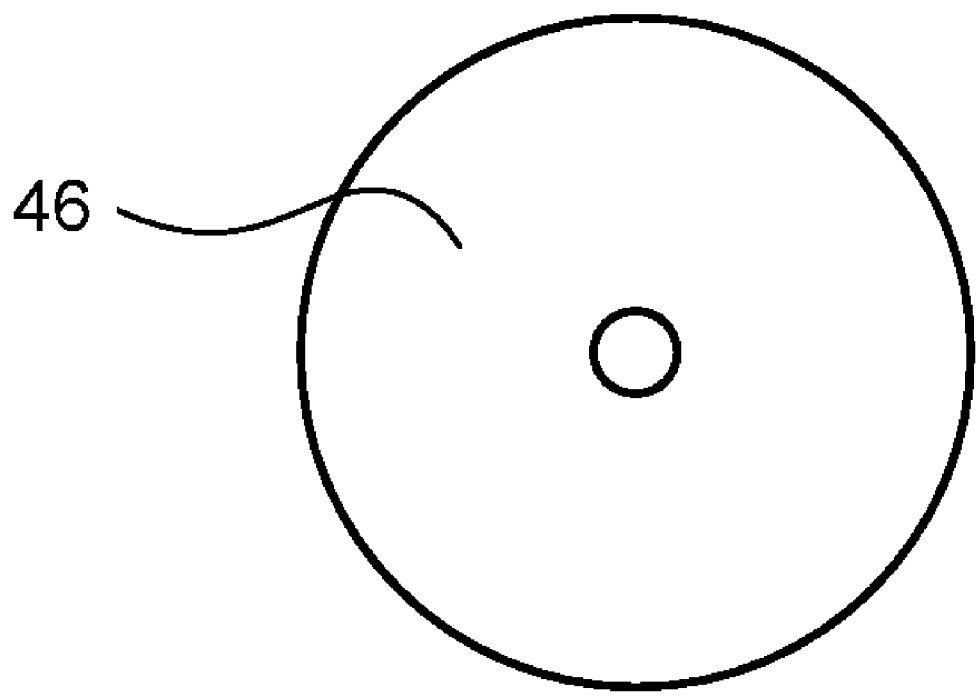
FIG. 6 shows a CD ROM on which program code for executing the method according to the invention is provided.

In general, as previously explained, short-range-control 40 may be configured to perform the exemplifying method described above, and provided in the form of one or more processors with corresponding memory containing the appropriate software in the form of a program code. However, the program code can also be provided on a data carrier such as a CD ROM disc 46 as depicted in FIG. 6 or an insertable memory stick, which will perform the invention when loaded into a computer or into a phone having suitable processing capabilities. The program code can also be downloaded remotely from a server either outside or inside the cellular network or be downloaded via a computer like a PC to which the phone is temporarily connected.

The present invention has now been described with reference to exemplifying embodiments. However, the invention is not limited to the embodiments described herein. On the contrary, the full extent of the invention is only determined by the scope of the appended claims.

What is claimed is:

1. A method, performed by a communication device including a short-range unit to communicate with nearby wireless devices, a multi-directional antenna connected to the short-range unit, and at least one directional communication device connected to the short-range unit, where the at least one directional communication device includes a camera arrangement, the method comprising:
   detecting, using the multi-directional antenna, at least two of the nearby wireless devices within a communication range of the communication device;
   activating, when the multi-directional antenna detects the at least two of the nearby wireless devices, the at least one directional communication device;
   directing, upon the activation, the camera arrangement in a direction of a first one of the at least two of the nearby wireless devices;
   detecting, by the camera arrangement, light emitted from the first nearby wireless device, where the light includes connection information;
   establishing, based on the connection information, a connection to the first nearby wireless device; and
   communicating, upon establishing the connection, with the first nearby wireless device via the multi-directional antenna.

2. The method of claim 1, further comprising:
   at least one of demodulating or decoding the detected light to obtain the connection information.

3. The method of claim 1, where the directing the camera arrangement comprises projecting a defined light sensing area, of a selected scope, relative to the communication device.

4. The method of claim 1, where the connection information includes at least one of a frequency band associated with the first nearby wireless device, a channel of the frequency band, an indication whether the connection is open or private, or tariffs associated with the connection.

5. The method of claim 1, further comprising:
   recording, by the camera arrangement, an image of the first nearby wireless device, and
   identifying the first nearby wireless device based on the recorded image.

6. The method of claim 5, further comprising:
   determining the connection information from one or more markings in the recorded image, and
   comparing the connection information to stored information in the communication device.

7. The method of claim 1, where the multi-directional antenna comprises an omnidirectional antenna.

8. A communication device comprising:
a short-range unit to wirelessly communicate with a plurality of nearby wireless devices;
a multi-directional antenna, connected to the short-range unit, to detect at least two of the nearby wireless devices within a communication range of the wireless device;
at least one directional communication device to activate upon detection of the at least two nearby wireless devices; and
a camera arrangement, associated with the at least one directional communication device, to detect light, including connection information, emitted from a selected one of the at least two of the nearby wireless devices, where the at least one directional communication device establishes a connection to the selected wireless device based on the connection information, and communication is maintained with the selected wireless device via the multidirectional antenna.

9. The wireless communication device of claim 8, where the communication device at least one of demodulates or decodes the detected light to obtain the connection information.

10. The communication device of claim 8, where the camera arrangement projects a defined light sensing area, of a selected scope, relative to the communication device.

11. The communication device of claim 8, where the connection information includes at least one of a frequency band associated with the selected communication device, a channel of the frequency band, an indication whether the connection is open or private, or tariffs associated with the connection.

12. The communication device of claim 8, where the camera arrangement records an image of the selected wireless device and the communication device identifies the selected wireless device based on the recorded image.

13. The communication device of claim 12, where the short-range unit determines the connection information from one or more markings in the recorded image.

14. The communication device of claim 8, where the multi-directional antenna comprises an omnidirectional antenna.

15. A computer program product stored on a computer usable medium, including a readable program which, when the readable program is loaded in a communication device including a short-range unit for a wireless communication with a group of communication devices; a multi-directional antenna connected to the short-range unit; and at least one directional communication device including a camera arrangement, causes the communication device to:
detect, using the multi-directional antenna, at least two communication devices within a communication range of the communication device;
activate, when the multi-directional antenna detects the at least two of the communication devices, the at least one directional communication device; and
direct, upon the activation, the camera arrangement in a direction of a selected one of the at least two of the communication devices;
detect, by the camera arrangement, light emitted from the selected communication device, where the light includes connection information;
connect, based on the connection information, to the selected communication device; and
communicate, via the connection, with the selected communication device via the multi-directional antenna.

16. A computer program element having a program recorded thereon, where the program includes instructions which, when the program is loaded in a communication device including a short-range unit for a wireless communication with a group of communication devices; a multi-directional antenna connected to the short-range-unit; and at least one directional communication device including a camera arrangement; cause the communication device to:
detect, using the multi-directional antenna, at least two of the communication devices within a communication range of the communication device;
activate, when the multi-directional antenna detects the at least two of the communication devices, the at least one directional communication device; and
direct, upon the activation, the camera arrangement in a direction of a selected one of the at least two communication devices;
detect, by the camera arrangement, light emitted from the selected communication device, where the light includes connection information;
connect, based on the connection information, to selected communication device; and
communicate, via the connection, with the selected communication device via the multi-directional antenna.

* * * * *

UNITED STATES PATENT AND TRADEMARK OFFICE
CERTIFICATE OF CORRECTION

PATENT NO. : 7,769,348 B2
APPLICATION NO. : 11/625143
DATED : August 3, 2010
INVENTOR(S) : Anders Angelhag et al.

Page 1 of 1

It is certified that error appears in the above-identified patent and that said Letters Patent is hereby corrected as shown below:

Column 15, line 19 should spell: 9. The communication device of claim 8, where

Signed and Sealed this

Fifth Day of October, 2010

David J. Kappos
*Director of the United States Patent and Trademark Office*